United States Patent
Mirakyan et al.

(10) Patent No.: US 7,632,787 B2
(45) Date of Patent: Dec. 15, 2009

(54) LOW DAMAGE TREATMENT FLUIDS AND METHODS OF USING THE SAME

(75) Inventors: Andrey Mirakyan, Houston, TX (US); Andrew Schmidt, Houston, TX (US); Jesse C. Lee, Paris (FR); Jian Zhou, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 382 days.

(21) Appl. No.: 11/366,677

(22) Filed: Mar. 2, 2006

(65) Prior Publication Data
US 2006/0234872 A1    Oct. 19, 2006

Related U.S. Application Data

(60) Provisional application No. 60/671,021, filed on Apr. 13, 2005.

(51) Int. Cl.
*C09K 8/68* (2006.01)

(52) U.S. Cl. ........ 507/211; 166/300

(58) Field of Classification Search ........ 507/211; 166/300
See application file for complete search history.

(56) References Cited

U.S. PATENT DOCUMENTS

| 3,727,687 | A | * | 4/1973 | Clampitt et al. ........ 166/400 |
| 3,937,283 | A | * | 2/1976 | Blauer et al. ........ 166/307 |
| 4,579,670 | A | * | 4/1986 | Payne ........ 507/211 |
| 6,017,855 | A |   | 1/2000 | Dawson et al. ........ 507/209 |
| 6,435,277 | B1 |  | 8/2002 | Qu et al. ........ 166/281 |
| 6,488,091 | B1 |  | 12/2002 | Weaver et al. ........ 166/300 |
| 6,810,959 | B1 |  | 11/2004 | Qu et al. ........ 166/300 |
| 2002/0010101 | A1 | | 1/2002 | Pakulski et al. ........ 507/200 |

* cited by examiner

*Primary Examiner*—Timothy J. Kugel
*Assistant Examiner*—Atnaf Admasu
(74) *Attorney, Agent, or Firm*—Dave Cate; Robin Nava; Rachel Greene

(57) ABSTRACT

The invention relates to novel wellbore treatment methods and fluids using compositions formed from an aqueous medium, a regularly substituted hydrophilically functional polysaccharide having a degree of substitution from about 0.1 to about 0.5, wherein the percent of insoluble polysaccharide is about 10% or less, and a crosslinker. The wellbore treatment fluid is particularly useful for fracturing a subterranean formation penetrated by a wellbore.

24 Claims, 1 Drawing Sheet

Random substitution pattern (1a) vs Regular Substitution pattern (1b)

LOW DAMAGE TREATMENT FLUIDS AND METHODS OF USING THE SAME

This patent application is a non-provisional application of provisional application Ser. No. 60/671,021 filed Apr. 13, 2005, and claims the benefit of the filing date thereof.

BACKGROUND OF THE INVENTION

This invention relates to fluids and methods used in treating a subterranean formation. In particular, the invention relates to subterranean formation treatment methods and fluids using an aqueous composition of a hydrophilic polysaccharide, a crosslinker, and a breaking system. The wellbore treatment methods and fluids are particularly useful for fracturing a subterranean formation penetrated by a wellbore, resulting in very low residue in the formation after treatment, which provides improved retained conductivity.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like.

A hydraulic fracturing operation is a stimulation technique routinely performed on oil and gas wells to increase fluid production from subterranean reservoirs. Specially engineered fluids are often pumped at high pressures and rates into the reservoir to be treated, causing a fracture to open. Proppants, such as ceramic beads or grains of sand, are slurried with the treating fluid (also referred to as carrier fluid) to keep the fracture propped open once the treatment is completed.

In a hydraulic fracturing operation, the fracturing fluid is a critical component of the hydraulic fracturing treatment. Its main functions are to open the fracture and to transport propping agent to the fracture. Because of their low cost, high performance and ease of handling, polymer-based fluids are the most widely used fracturing fluids. Many water-soluble polymers can be used to make a viscosified solution capable of suspending proppants, but the most widely used are guar gum and its derivatives. Guar is a long-chain, high molecular weight polymer composed of a mannose backbone and galactose side chains. The guar polymers have a high affinity for water. When the powder is added to water, the guar particles swell and hydrate. In this state, the polymer molecules are associated with many water molecules, thus unfolding and extending out into the solution, giving a viscous fluid.

Leaving a high-viscosity fluid in the fracture would reduce the permeability of the proppant pack to oil and gas, limiting the effectiveness of the fracturing treatment. Gel breakers are used to reduce the viscosity of the fluid intermingled with the proppant. For most common system, breakers reduce viscosity by cleaving the polymer chain into small molecular weight fragments. Applied to conventional polymers (i.e. guar, CMHPG, HPG, etc.), breakers leave a significant amount of insoluble polymer fragments after breaking, thus resulting in reduced retained permeability of the fracture.

There is much art dealing with the issue of improving retained permeability of the fracture. One common way to achieve a cleaner proppant pack is based on the idea of using low polymer loadings (1-3 Kg/1000 liters) to prepare a fracturing fluid. High retained fracture conductivity can also be achieved by using low molecular weight compounds as viscosifying agents in the fracturing fluids. Compounds such as de-polymerized carbohydrates or quaternary ammonium surfactants have been proven to provide a good retained conductivity, but have drawbacks such as high fluid loss into the formation, as well as high loadings of viscosifying agent to attain sufficient fluid viscosity.

Thus, the need exists for viscous fluids for oilfield treatments which provide high retained conductivity after treatment, and a fluid that can achieve this would be highly desirable. These needs are met at least in part by the following invention.

SUMMARY OF THE INVENTION

The invention treatment fluids and methods useful for treating a subterranean formation penetrated by a wellbore. In particular, the invention relates to aqueous wellbore treatment fluids and methods of using such fluids, where the fluids contain an aqueous medium, a hydrophilically modified polysaccharide, and crosslinker, which function in conjunction with a breaker system, to provide very low residue after treating, thus providing high retained conductivity.

Fluids useful in well treatment methods and compositions include an aqueous medium, a hydrophilic polysaccharide having a degree of substitution from about 0.1 to about 0.5, wherein the percent of insoluble polysaccharide residue after breaking is about 10% or less, and a crosslinking agent. The hydrophilic polysaccharide polymers used in the well treatment fluids may be modified with ionic, nonionic, or amphoteric groups, which function in solubilizing the broken polymer fragments after treatment. The pattern in which these groups have been substituted and distributed along the polymer backbone is substantially regular or homogeneous, rather than random. The ionic group substitution on the polymer backbone may be cationic or anionic. Upon breaking the regularly substituted hydrophilically modified polysaccharide polymers, a lesser quantity of insoluble fragments are formed, as compared with randomly substituted polysaccharide polymers, contributing to improved cleanup and retained conductivity.

BRIEF DESCRIPTION OF THE DRAWING

The invention may be understood by reference to the following description taken in conjunction with the accompanying drawing, in which the leftmost significant digit(s) in the reference numerals denote(s) the first figure in which the respective reference numerals appear, and in which.

DETAILED DESCRIPTION

Figure 1:
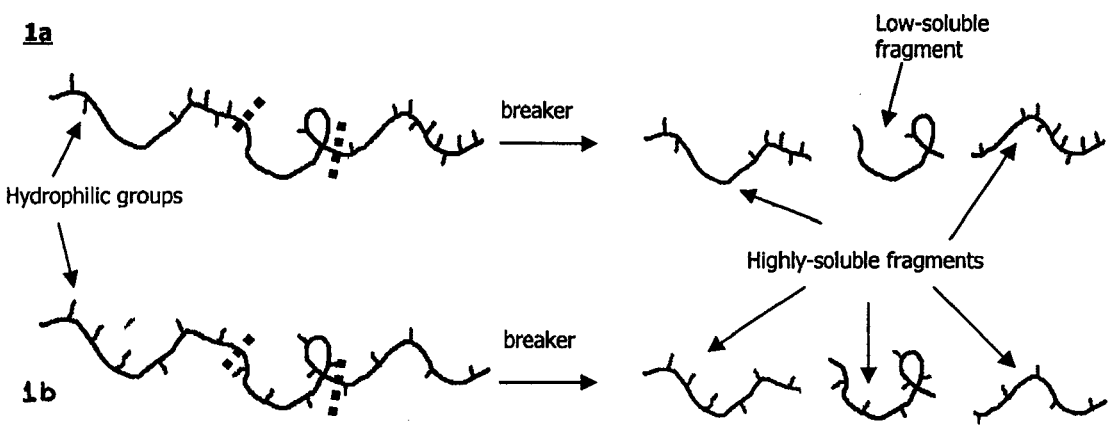
FIG. 1 illustrates substitution patterns and the effect after breaking, where random substitution patterns are shown in 1*a*, while regular substitution patterns are shown in 1*b*.

The description and examples are presented solely for the purpose of illustrating the preferred embodiments of the invention and should not be construed as a limitation to the scope and applicability of the invention. While the methods and compositions of the present invention are described herein as comprising certain materials and steps, it should be understood that the methods and composition could optionally comprise two or more chemically different materials or different steps. In addition, the methods and composition can also comprise some components and steps others than the ones cited. In the summary of the invention and this detailed description, each numerical value should be read once as modified by the term "about" (unless already expressly so modified), and then read again as not so modified unless otherwise indicated in context.

The invention relates to well treatment fluids and methods useful for treating a subterranean formation penetrated by a wellbore. In particular, the invention relates to aqueous wellbore treatment fluids and methods of using such fluids, where the fluids contain an aqueous medium, a hydrophilically modified polysaccharide, crosslinker, and where the fluid works in conjunction with a breaker system. The wellbore treatment methods and fluids are particularly useful for fracturing a subterranean formation with very low residue, thus providing high retained conductivity.

Some embodiments of the invention are methods for treating a subterranean formation penetrated by a wellbore. These methods generally include preparing a treatment fluid containing an aqueous medium, a regularly substituted hydrophilically functional polysaccharide, where the percent of polysaccharide residue after breaking is about 10% or less, and a crosslinking agent. Further, the treatment fluid is injected into the wellbore at a pressure sufficient to treat the formation, and a breaking system is introduced which causes a reduction in viscosity of the fluid after its injection, but does not significantly impact fluid viscosity at surface and during fluid injection. The retained conductivity after breaking may be 50% or greater. Pressures sufficient to treat the formation will be readily known to those with skill in the art, and may vary by particular treatment operation. The embodiments of the invention are useful in oilfield operations, including such operations as fracturing subterranean formations, modifying the permeability of subterranean formations, fracture or wellbore cleanup, acid fracturing, matrix acidizing, gravel packing or sand control, and the like. Another application includes the placement of a chemical plug to isolate zones or to assist in an isolating operation.

Inventors have unexpectedly discovered a unique and novel approach to achieve high retained conductivity after treatment. The polysaccharide polymers used are modified with hydrophilic groups that assist in solubilizing the polymer fragments upon breaking after a formation treatment. The keys to the superior clean up of such polysaccharide polymers is in the type of group substituted on the polymer backbone, the pattern in which these groups have been consistently substituted (regularly or homogeneously), and the degree of substitution. This approach differs and is a significant improvement over known systems, which use random substitution (lacking a definite plan, purpose, or pattern), and not regular, or arranged substitution patterns.

By hydrophilically modified it is meant that the functional groups of the polysaccharide polymer have a strong affinity for water. Some examples of hydrophilic functional groups include nonionic groups, ionic groups (i.e. cationic or anionic), or amphoteric groups. Preferably, the hydrophilically modified polysaccharide will have a degree of substitution of hydrophilic groups of about 0.10 to about 0.50. The substitution pattern should be regular. By regular, it is meant that the functional groups are dispersed substantially evenly about the polymer backbone, and not randomly distributed. Upon breaking, randomly substituted polymers give a significant portion of segments that have little or no hydrophilic substitutions, and as such, these segments are less water soluble than segments with a greater number of hydrophilic substitutions. When breaking regularly substituted hydrophilically functional polymers, a lesser quantity of water insoluble fragments are formed than randomly substituted hydrophilic polymers (see FIG. 1). Insoluble residues may cause proppant pack damage that may result in lower fracture conductivities. In FIGS. 1, 1a & 1b illustrate substitution patterns, where random substitution patterns are shown in 1a, while regular substitution patterns are shown in 1b.

As stated above, polysaccharides useful embodiments of the invention are modified to have hydrophilic functional groups. In one approach, modification of the polysaccharides is achieved by grafting hydrophilically functional pendant chains onto the polysaccharide polymer chains. For example, hydrophilic pendant chains could be introduced through chemical reactions, such as esterification, substitution, etc., in between the carboxyl or hydroxyl groups of the polymers and the functional groups of the hydrophilic pendant molecules.

Any suitable cationic functional groups may be used. One useful group is a quaternary ammonium group. Typical quaternary ammonium groups are methylene trimethylammonium chloride and bromide, benzyltrimethylammonium chloride and bromide, ethylene triethylammonium chloride and bromide, butylenes tributylammonium chloride and bromide, and the like, or any combination thereof. Some suitable hydrophilic groups which are anionic functional groups include, but are not limited to, carboxylate groups, carboxyalkyl groups, carboxyalkylhydroxyalkyl groups, sulfate groups, sulfonate groups, sultaine groups, phosphate groups, phosphonate groups, alkanolamides, alkyl betaines, ethoxylates, and the like, or any combination thereof. An alkyl group includes any hydrocarbon radical such as methyl, ethyl, propyl, butyl, etc. A particularly useful type of hydrophilically modified polysaccharide polymer is a cationic polysaccharide, an example of which is a cationic quaternary ammonium substituted guar polymer.

The hydrophilically modified polysaccharides (polysaccharide polymers) useful in the invention may have a degree of substitution from about 0.10 to about 0.50. The polysaccharides can have a degree of substitution of about 0.10, about 0.15, about 0.20, about 0.25, about 0.30, about 0.35, about 0.40, about 0.45, or about 0.50, or any range between two of these values. The degree of substitution refers to the average number of hydrophilically functional groups per repeating unit of the polysaccharide polymer backbone. A guar polymer consists of a $\beta$-D-mannopyranose backbone with branch points from their 6-positions linked to $\alpha$-D-galactose. There are between about 1.5 to about 2 mannose residues for every galactose residue. Therefore, the repeating unit is two mannose residues with one glycosidic linkage and a galactose residue linked to a hydroxyl group on one of the mannose residues. On average, each sugar residue contains three available hydroxyl sites that can be substituted by a hydrophilic group (hydrophilic functional group). If, on average, each of these three sites has been substituted with a hydrophilic group the degree of substitution would be three.

Fluid embodiments according to the invention include an aqueous medium, a hydrophilically functional polysaccharide comprising one or more ionically modified polysaccharides; and a crosslinking agent. The fluid may contain a breaker or work in conjunction with a breaker, and may also contain one or more buffers, proppant, and other additives that are commonly used in the art.

The base polysaccharide, used as a precursor to prepare the hydrophilically functional polysaccharide, may be natural or synthetic. Some natural polysaccharides that may be used in the practice of this invention include, but are not limited to, guar gum, locust bean gum, tara gum, karaya gum, arabic gum, ghatti gum, tragacanth gum and the like. If desired, any combination of any of the polysaccharides described herein may be used. Also, the polysaccharide may be carboxyalkyl cellulose ether, carboxymethyl hydroxyethyl cellulose (CM- HEC), hydroxyalkyl cellulose, hydroxyalkylalkyl cellulose, alkylalkyl cellulose, alkylcarboxyalkyl cellulose, alkyl cellulose or alkylhydroxyalkyl cellulose.

Examples of some suitable hydrophilically modified polysaccharides with one or more substituted cationic quaternary ammonium groups include JAGUAR® C-14, JAGUAR® C-17, or JAGUAR® EXCEL (available by Rhodia Inc., Cranbury, N.J. 08512), HC456P, HC656P, C411, C411/XF, C412P/XF, C417P, C611, C612P or C617P (available by Lamberti, spa, Hungerford, Tex., 77448), and N-HANCE® 3196, 3215, or 3000 (available by Hercules Chemical Co., Wilmington, Del. 19894).

Examples of some suitable hydrophilically modified polysaccharides with one or more substituted anionic groups include GALACTASOL® 651, GALACTASOL® 653, AQUAPAC® LV (available by Hercules Chemical Co., Wilmington, Del. 19894), ECOPOL® 18, and ECOPOL® 518 (both available from Economy Polymers & Chemicals Company, Houston, Tex. 77047).

Fluids used in embodiments of the invention may have any suitable viscosity properties for the particular treatment application. Preferably, the well treatment fluid has a viscosity above about 50 mPa·s at 100 sec$^{-1}$, and more preferably, above about 100 mPa·s at 100 sec$^{-1}$ when it is injected. After being broken, the fluid preferably has a viscosity below about 20 centipoise at 100 sec$^{-1}$, and more preferably, below about 10 centipoise at 100 sec$^{-1}$.

Fluids may also include any suitable gas that forms an energized fluid or foam when introduced into the aqueous medium. See, for example, those fluids disclosed in U.S. Pat. No. 3,937,283 (Blauer et al.), hereinafter incorporated by reference. Preferably, the gas component may be nitrogen, air, carbon dioxide, argon and any mixtures thereof. More preferably the gas component comprises carbon dioxide, in any quality readily available. The gas component assists in the fracturing operation and the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent.

The hydrophilic polysaccharide polymers are incorporated into the fluids useful according to the invention in amounts ranging from about 0.01% to about 5.0% by weight of total weight of composition, and preferably from about 0.10% to about 1.0% by weight of total weight of composition.

In embodiments of the invention, a crosslinking agent is present, and the polysaccharide may be crosslinked with such a crosslinker. Adding crosslinkers may further augment the viscosity of the composition. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium.

An electrolyte which may be an organic acid, organic acid salt, or inorganic salt may also be used in the fluids according to the invention. Mixtures of the above members are specifically contemplated as falling within the scope of the invention. This member will typically be present in a minor amount (e.g. less than about 30% by weight of the composition).

The organic acid may be a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred organic acids are formic acid, citric acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, and 3,4-dichlorobenzoic acid.

The inorganic salts that are particularly suitable include, but are not limited to, water-soluble potassium, sodium, and ammonium salts, such as potassium chloride and ammonium chloride. Additionally, magnesium chloride, calcium chloride, calcium bromide, zinc halide, sodium carbonate, and sodium bicarbonate salts may also be used. Any mixtures of the inorganic salts may be used as well. The inorganic salts may aid in the development of increased viscosity that is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight and as such the density of fluid is not significantly altered by the presence of the inorganic salt unless fluid density becomes an important consideration, at which point, heavier inorganic salts may be used. In a preferred embodiment of the invention, the electrolyte is potassium chloride. The electrolyte is preferably used in an amount of from about 0.01 wt % to about 12.0 wt % of the total weight, and more preferably from about 1.0 wt % to about 8.0 wt % of the total weight.

Embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total weight. Preferably, when used, the organoamino compound is incorporated at an amount from about 0.05 wt % to about 1.0 wt % based on total weight. A particularly useful organoamino compound is tetraethylenepentamine.

Methods and fluids according to the invention may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution AQUAT® 944 (available from Baker Petrolite of Sugar Land, Tex., 77478). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. When used, any effective amount of surfactant or blend of surfactants may be used, preferably the in an amount of about 0.02 wt % to about 5 wt % of total weight, and more preferably from about 0.05 wt % to about 2 wt % of total weight.

Friction reducers may also be incorporated into embodiments of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.), incorporated herein by reference thereto, or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives.

Fluids useful in accordance with the invention may contain, and/or be used in conjunction with, a breaking system containing a breaker. The purpose of the breaker system is to "break" or diminish the viscosity of the fluid so that this fluid is more readily recovered from the formation after treatment, such as in fracturing or cleanup, for example. The breaking system is provided to reduce in viscosity of the fluid after its injection while not significantly impacting viscosity at surface and during the injection. With regard to breaking down viscosity, any effective material in any suitable amount may be used, including, but not necessarily limited to, those materials which are known in the art as oxidizers, enzymes, bases, or acids. The breaking system may be selected and incorporated to provide a 50% or greater retained conductivity after breaking, preferably 60% or greater, more preferably 70% or greater.

Breakers reduce the polymer's molecular weight by the action on the polysaccharide polymer itself. The acid-type of breaker may be esters which convert to acids under well-treating conditions. See, for example, U.S. Pat. No. 3,960,736, which is hereby incorporated by reference. The breaker may be encapsulated or in an enclosure to the delay the release of the breaker, such as those disclosed in U.S. Pat. No. 4,741,401 (Walles, et. al), hereinafter incorporated by reference thereto.

Of the oxidizer based breakers, some examples of suitable oxidizing agents include: ammonium, sodium or potassium persulfate; sodium peroxide; sodium chlorite; sodium, lithium or calcium hypochlorite; bromates; peroxides; perborates; permanganates; chlorinated lime; potassium perphosphate; magnesium monoperoxyphthalate hexahydrate; and a number of organic chlorine derivatives such as N,N'-dichlorodimethylhydantoin and N-chlorocyanuric acid and/or salts thereof. The specific breaker employed may depend on the temperature to which polymer gel is subjected. At temperatures ranging from about 50° C. to about 95° C., an inorganic breaker or oxidizing agent, e.g., $KBrO_3$, and other similar materials, e.g., $KClO_3$, $KIO_3$, peroxides, perborates, persulfates, permanganates (for example, ammonium persulfate, sodium persulfate, and potassium persulfate) and the like, are used to control degradation of the polymer gel. At about 90 to 95° C. and above, typical breakers include any suitable breaker, an example of which is sodium bromate.

As indicated hereinabove, an enzyme, or enzymes, may be employed as a breaker. Enzymes suitable for this purpose are those which catalyze the hydrolysis of the glycosidic bonds between the monomer units of the polysaccharide polymer. The selection of a suitable enzyme for a particular polysaccharide, e.g., galactomannan, gum can be determined from references well known in the art, see for example Smith and Montgomery, The Chemistry of Plant Gums, Monograph Series, No. 141, 1959, pp. 151-156. The amount of enzyme employed in any particular gel solution as defined herein will depend on the amount of galactomannan gum present, and also upon the temperature and pH to which the set gel is to be subjected. Generally, about 0.01 to 2.0 percent by weight of enzyme of the weight of gum employed is satisfactory.

Fluids useful in some embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of composition. Also, any of the proppant particles can further be coated with a resin to potentially improve the strength, clustering ability, and flow back properties of the proppant.

The aqueous medium used in embodiments of the invention may be fresh water, salt water, seawater, natural or synthetic brine, or any other aqueous liquid that does not adversely react with the other components of the well treatment fluid to affect its performance. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in fluids useful in embodiments of the invention, to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the composition, preferably the concentration of fibers are from about 2 to about 12 grams per liter of composition, and more preferably from about 2 to about 10 grams per liter of composition.

Other additives and chemicals, known by those skilled in the art to be commonly used in oilfield applications, may be used in the invention. These include, but are not necessarily limited to, materials such as surfactants, breaker aids, oxygen scavengers, alcohols, scale inhibitors, corrosion inhibitors, fluid-loss additives, bactericides, and the like. Also, they may include a co-surfactant to optimize viscosity or to minimize the formation of stable emulsions that contain components of crude oil or a polysaccharide or chemically modified polysaccharide, another polymer such as cellulose, derivatized cellulose, guar gum, derivatized guar gum, xanthan gum, or synthetic polymers such as polyacrylamides and polyacrylamide copolymers, and biocides such as 2,2-dibromo-3-nitrilopropionamine.

Some embodiments of the invention are methods of hydraulically fracturing a subterranean formation penetrated by a wellbore. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In many cases, a hydraulic fracturing consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In a fracturing treatment, fluids according to the invention may be used in the pad treatment, the proppant stage, or both. The components of the fluids are preferably mixed on the surface. Also, a fluid may be prepared on the surface and pumped down tubing, while a gas component could be pumped down the annular to mix down hole, or vice versa.

Yet another embodiment of the invention is a method of cleanup. The term "cleanup" or "fracture cleanup" refers to the process of removing the fracture fluid (without the proppant) from the fracture and wellbore after the fracturing process has been completed. Techniques for promoting fracture cleanup traditionally involve reducing the viscosity of the fracture fluid as much as practical so that it will more readily flow back toward the wellbore.

In another embodiment, the invention relates to methods for gravel packing a wellbore. For gravel packing, the fluid preferably comprises gravel or sand and other optional additives such as filter cake clean up reagents such as chelating agents referred to above or acids (e.g. hydrochloric, hydrofluoric, formic, acetic, citric acid) corrosion inhibitors, scale inhibitors, biocides, leak-off control agents, among others. For this application, suitable gravel or sand is typically having a mesh size between 8 and 70 U.S. Standard Sieve Series mesh.

The following examples are presented to illustrate the preparation and properties of fluids including regularly substituted hydrophilic functional modified polysaccharides, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Examples 1 and 2

Conductivity Tests

Two fluid samples based upon the regularly substituted hydrophilic cationic guar, Lamberti C417P, were prepared. The degree of substitution was 0.32 +/−0.03. Each fluid was prepared with water and other typically incorporated materials, example 1 using a zirconium based crosslinking agent, and example 2 with a boron based crosslinking agent. Concentrations of fluid components are given as percent by weight of the total fluid weight. The formulations were as follows:

Example 1

| Ingredient | Wt Percent |
|---|---|
| C417P Regularly Substituted Cationic Guar | 0.48% |
| Potassium Chloride | 2.00% |
| Zirconium Crosslinker | 0.06% |
| Sodium Hydroxide | 0.01% |
| Sodium Bicarbonate | 0.07% |
| Sodium Thiosulfate Pentahydrate | 0.24% |
| Encapsulated Sodium Bromate | 0.06% |
| Water | 97.08% |

Example 2

| Ingredient | Wt Percent |
|---|---|
| C417P Regularly Substituted Cationic Guar | 0.36% |
| Potassium Chloride | 2.00% |
| Boric Acid | 0.10% |
| Sodium Hydroxide | 0.19% |
| Surfactant | 0.10% |
| Ammonium Persulfate | 0.04% |
| Water | 97.21% |

As is well known to those of skill in the art, it is important to remove the broken gel from the generated conductivity channels upon completion of well treatment to maximize the production rate. The retained conductivity of the propped fracture is a useful indication of the cleanliness of a well treatment fluid.

Immediately after the preparation, fluids were evaluated for conductivity properties. The tests were performed according to API Standard RP61, which is incorporated herein by reference. The results were: 71% retained conductivity for regularly substituted cationic guar C417P crosslinked with zirconium based crosslinker (example 1), which compares with less than 50% retained conductivity, which is common for a zirconium crosslinked randomly substituted cationic guar; and, 78% retained conductivity for regularly substituted cationic guar C417P crosslinked with boron based crosslinker (example 2), which compares with less than about 40% retained conductivity, which is common for a boron crosslinked randomly substituted cationic guar. As described earlier and is demonstrated above, regularly substituted water soluble polymers, when broken, give cleaner fluids than randomly substituted water soluble polymers.

Example 3

Clean-Up Tests

Regular and random substitution patterns may be differentiated by several methods including, but not limited to, enzymatic degradation of the polymer backbone. An enzyme is used to selectively hydrolyze the polymer backbone while the viscosity is measured. Regularly-substituted polymers degrade more slowly than randomly-substituted patterns.

The procedure used in this example uses two 50 ml fluid samples for two polymers (C417P—regularly substituted cationic guar derivative, and a commonly available randomly substituted CMHPG), each sample containing 480 mg of the polymer and 18 mg of the breaker (ammonium persulfate). The samples were placed in the oven at 88° C. for a period of 15 hours. After that the samples were centrifuged to separate the insoluble part of the broken fluid. The collected insoluble portion was then removed from rest of fluid, dried and weighed, for each. The data from this example is summarized in Table 1:

TABLE 1

| | C417P | CMHPG |
|---|---|---|
| Insoluble Residue (mg): | 24 | 54 |
| Insoluble Polysaccharide: | | |
| Residue % by weight | 5% | 11.3% |
| Retained Permeability (%): | 64% | 26%, 36% |

These results illustrate that fluids and treatment methods with improved clean-up are provided, when regularly substituted hydrophilically functional polysaccharides are used in formation treatment fluids, since the insoluble polysaccharide residual content upon breaking is less that 10% by weight based upon total polysaccharide, or even 5% and lower.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for treating a subterranean formation penetrated by a wellbore, the method comprising:
    a) preparing a treatment fluid comprising:
        i. an aqueous medium,
        ii. a regularly substituted hydrophilically functional polysaccharide having a degree of substitution from about 0.1 to about 0.5, wherein the percent of insoluble polysaccharide residue after breaking is about 10% or less, and
        iii. a crosslinking agent;
    b) injecting the treatment fluid into the wellbore at a pressure sufficient to treat the formation; and
    c) providing a breaking system that causes a reduction in viscosity of the fluid after its injection but does not significantly impact fluid viscosity at surface and during the injection;
    whereby the retained conductivity after breaking is 50% or greater.

2. The method according to claim 1 wherein the polysaccharide is selected from the group consisting of carboxyalkyl cellulose ether, carboxymethyl hydroxyethyl cellulose (CM-HEC), hydroxyalkyl cellulose, hydroxyalkylalkyl cellulose, alkylalkyl cellulose, alkylcarboxyalkyl cellulose, alkyl cellulose, alkyhydroxyalkyl cellulose, guar gum, locust bean gum, tara gum, karaya gum, arabic gum, ghatti gum, tragacanth gum, hydroxypropylguar (HPG), carboxymethylguar (CMG), and carboxymethylhydroxypropylguar (CMHPG).

3. The method according to claim 1 wherein hydrophilically functional polysaccharide is a cationic functional guar gum.

4. The method according to claim 1, wherein the fluid further comprises an electrolyte selected from the group consisting of organic acids, organic acid salts, inorganic salts, and combinations of one or more organic acids or organic acid salts with one or more inorganic salts, and the electrolyte is incorporated in an amount of from about 0.01 wt % to about 12.0 wt %, based upon total fluid weight.

5. The method according to claim 1, wherein the fluid further comprises a gas component selected from the group consisting of carbon dioxide, air and any mixtures thereof, and wherein the gas component comprises from about 10 vol % to about 90 vol %.

6. The method according to claim 1 wherein the hydrophilically functional polysaccharide is incorporated in an amount from about 0.01% to about 1.00% by weight, based upon total fluid weight.

7. The method according to claim 1 wherein the hydrophilically functional polysaccharide is incorporated in an amount from about 0.10% to about 0.50% by weight, based upon total fluid weight.

8. The method according to claim 1, wherein the fluid further comprises a proppant selected from the group consisting of sand, walnut shells, sintered bauxite, glass beads, ceramic materials, naturally occurring materials, or any mixtures thereof.

9. The method according to claim 1, wherein the fluid further comprises a crosslinking agent contains a metal ion selected from the group consisting of chromium, iron, aluminum, antimony, boron, titanium, and zirconium.

10. The method according to claim 1, wherein the fluid further comprises a breaker.

11. The method according to claim 1, wherein the fluid further comprises an organoamino compound incorporated in an amount from about 0.01 wt % to about 2.0 wt % based on total fluid weight.

12. The method according to claim 1, wherein the retained conductivity after treatment is 60% or greater.

13. The method according to claim 1, wherein the retained conductivity after treatment is 70% or greater.

14. The method according to claim 1, wherein the fluid further comprises a fiber component.

15. The method according to claim 1, wherein the percent of insoluble polysaccharide residue after breaking is about 5% or less.

16. The method according to claim 1, wherein the treatment fluid breaking system comprises oxidizers, enzymes, bases, acids, or any combination thereof.

17. A method of fracturing a subterranean formation penetrated by a wellbore, the method comprising:
a) preparing a fracturing fluid comprising:
i. an aqueous medium,
ii. a regularly substituted hydrophilically functional polysaccharide having a degree of substitution from about 0.1 to about 0.5, wherein the percent of insoluble polysaccharide residue after breaking is about 10% or less, and
iii. a crosslinking agent;
b) introducing the fracturing fluid into the wellbore at a pressure sufficient to fracture the formation;
c) providing a breaking system that causes a reduction in viscosity of the fluid after its injection but does not significantly impact fluid viscosity at surface and during the injection; and
whereby the retained conductivity after fracturing is greater than 50%.

18. The method according to claim 17, wherein the retained conductivity after fracturing is 60% or greater and wherein the percent of insoluble polysaccharide residue after breaking is about 5% or less.

19. The method according to claim 17 wherein hydrophilically functional polysaccharide is a cationic functional guar gum.

20. The method according to claim 17, wherein the treatment fluid breaking system comprises oxidizers, enzymes, bases, acids, or any combination thereof.

21. A wellbore treatment fluid comprising
an aqueous medium,
a regularly substituted hydrophilically functional polysaccharide having a degree of substitution from about 0.1 to about 0.5,
wherein the percent of insoluble polysaccharide residue after breaking is about 10% or less, and a crosslinking agent.

22. The wellbore treatment fluid according to claim 21 wherein hydrophilically functional polysaccharide is a cationic functional guar gum.

23. The wellbore treatment fluid according to claim 21 wherein the hydrophilically functional polysaccharide is incorporated in an amount from about 0.01% to about 1.00% by weight, based upon total fluid weight.

24. The wellbore treatment fluid according to claim 21, wherein the percent of insoluble polysaccharide residue after breaking is about 5% or less.

* * * * *